(12) United States Patent
Hiekata

(10) Patent No.: US 10,676,900 B2
(45) Date of Patent: Jun. 9, 2020

(54) ATTACHMENT RECOGNITION DEVICE

(71) Applicants: Kobe Steel, Ltd., Kobe-shi (JP);
KOBELCO CONSTRUCTION MACHINERY CO., LTD., Hiroshima-shi (JP)

(72) Inventor: Takashi Hiekata, Kobe (JP)

(73) Assignees: Kobe Steel, Ltd., Kobe-shi (JP);
KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 16/081,143

(22) PCT Filed: Feb. 10, 2017

(86) PCT No.: PCT/JP2017/004837
§ 371 (c)(1),
(2) Date: Aug. 30, 2018

(87) PCT Pub. No.: WO2017/150134
PCT Pub. Date: Sep. 8, 2017

(65) Prior Publication Data
US 2019/0093321 A1     Mar. 28, 2019

(30) Foreign Application Priority Data

Mar. 2, 2016   (JP) ................... 2016-040044

(51) Int. Cl.
*E02F 9/26*     (2006.01)
*G06T 7/00*     (2017.01)
(Continued)

(52) U.S. Cl.
CPC ............... *E02F 9/265* (2013.01); *E02F 3/36* (2013.01); *E02F 3/96* (2013.01); *E02F 3/963* (2013.01);
(Continued)

(58) Field of Classification Search
CPC ... E02F 9/265; E02F 3/36; E02F 9/264; E02F 3/963; E02F 9/24; E02F 3/96;
(Continued)

(56) References Cited

U.S. PATENT DOCUMENTS

2005/0261799 A1   11/2005   Groth et al.
2011/0061755 A1    3/2011   Hanakawa et al.

FOREIGN PATENT DOCUMENTS

JP   7-268902 A   * 10/1995
JP   2004-294067 A   10/2004
(Continued)

OTHER PUBLICATIONS

Extended European Search Report dated Feb. 18, 2019 in Patent Application No. 17759605.3, 6 pages.
(Continued)

*Primary Examiner* — Brian P Sweeney
(74) *Attorney, Agent, or Firm* — Oblon, McClelland, Maier & Neustadt, L.L.P.

(57) ABSTRACT

A region extraction unit extracts a region indicating distance distribution of an attachment from distance image data acquired by a distance sensor by using a posture detected by a posture detection unit. A feature amount extraction unit extracts a feature amount of the attachment from the region indicating the distance distribution of the attachment extracted by the region extraction unit. An attachment recognition unit compares the feature amount extracted by the feature amount extraction unit with a feature amount of one or more reference attachments stored in a database to recognize the attachment.

6 Claims, 9 Drawing Sheets

(51) Int. Cl.
*G06T 7/73* (2017.01)
*E02F 3/36* (2006.01)
*E02F 3/96* (2006.01)
*E02F 9/24* (2006.01)

(52) U.S. Cl.
CPC ............... *E02F 9/24* (2013.01); *E02F 9/264* (2013.01); *G06T 7/00* (2013.01); *G06T 7/001* (2013.01); *G06T 7/73* (2017.01); *G06T 2207/30164* (2013.01)

(58) Field of Classification Search
CPC . G06T 7/001; G06T 7/73; G06T 2207/30164; G06T 7/00
USPC .......................................................... 701/50
See application file for complete search history.

(56) References Cited

FOREIGN PATENT DOCUMENTS

| JP | 2005-248502 A | | 9/2005 |
|---|---|---|---|
| JP | 2010-242375 A | | 10/2010 |
| JP | 2012-233353 A | * | 11/2012 |
| JP | 2013-118677 A | | 6/2013 |
| JP | 2016-8484 A | | 1/2016 |

OTHER PUBLICATIONS

International Search Report dated Apr. 25, 2017 in PCT/JP2017/004837 filed Feb. 10, 2017.

* cited by examiner

ATTACHMENT RECOGNITION DEVICE

TECHNICAL FIELD

The present invention relates to an attachment recognition device for recognizing an attachment installed in an attachment installation unit in a construction machine equipped with a work device including the attachment installation unit in which a plurality of types of attachment is installed in a replaceable manner.

BACKGROUND ART

In a construction machine equipped with a replaceable attachment such as a hydraulic excavator, a user performs work by appropriately changing an attachment such as a bucket, a nibbler, and a breaker according to the work. If the construction machine fails to recognize information such as a size of the attachment, interference prevention control for preventing interference of the attachment in a cab and operation control of a work device according to the attachment (for example, automatic horizontal pulling control of a bucket) may not function effectively. Therefore, the construction machine needs to recognize the currently installed attachment.

As a method for recognizing an attachment and a method for measuring a size of an attachment, Patent Literatures 1 and 2 are known.

Patent Literature 1 discloses a technique in which, when a service person replaces an attachment, the service person inputs identification information about the attachment and transmits the identification information together with the input date and time to a terminal device, and then the terminal device manages the attachment installed in a construction machine.

Patent Literature 2 discloses a technique to obtain a difference in measurement data of a predetermined part between a standard attachment and a replacement attachment when the standard attachment serving as an attachment before replacement and the replacement attachment are set in a predetermined measurement posture, and to calculate numerical data about a size and shape of the replacement attachment based on the obtained difference and previously stored numerical data about the size and shape of the standard attachment.

Specifically, in Patent Literature 2, a posture of a bucket is set in a posture in which a tip is brought into contact with the ground to cause an upper surface to agree with a vertical direction before and after bucket replacement, angles of a boom and an arm are measured, and the measured angles are substituted into a predetermined arithmetic expression to obtain an attachment length.

However, Patent Literature 1 is based on manual input of the identification information by the service person, causing a problem that human error such as input error and forgotten input occurs.

Patent Literature 2 has a problem that measurement takes time because both attachments of the standard attachment and the replacement attachment are set in the measurement posture by an operator's operation. Also, Patent Literature 2 has a problem that, since it is necessary to measure the standard attachment serving as an attachment before replacement, if measurement work is neglected at the time of replacement of the attachment, the replacement attachment cannot be recognized.

CITATION LIST

Patent Literature

Patent Literature 1: Japanese Patent Application Laid-Open No. 2013-118677
Patent Literature 2: Japanese Patent Application Laid-Open No. H07-268902

SUMMARY OF INVENTION

It is an object of the present invention to provide an attachment recognition device capable of recognizing an attachment in a short time even if identification information about the attachment is not input in recognition of the attachment.

An attachment recognition device according to one aspect of the present invention is an attachment recognition device for recognizing an attachment installed in an attachment installation unit in a construction machine including a work device including the attachment installation unit in which a plurality of types of attachment is installed in a replaceable manner. The attachment recognition device includes: a posture detection unit configured to detect a posture of the work device; a distance sensor configured to measure distance distribution of a surrounding object including the installed attachment; a region extraction unit configured to extract a region indicating distance distribution of the installed attachment from the distance distribution measured by the distance sensor by using the posture detected by the posture detection unit; a feature amount extraction unit configured to extract a feature amount of the installed attachment from the region extracted by the region extraction unit; a database configured to store a feature amount of one or more types of reference attachment in advance; and an attachment recognition unit configured to make comparison of the feature amount extracted by the feature amount extraction unit and the feature amount of the reference attachment to recognize the installed attachment.

With this configuration, the attachment can be recognized even if no identification information about the attachment is manually input. In addition, since there is no need to measure the attachment before replacement, measurement work can be completed in a short time.

DESCRIPTION OF EMBODIMENTS

First Embodiment

Figure 1:
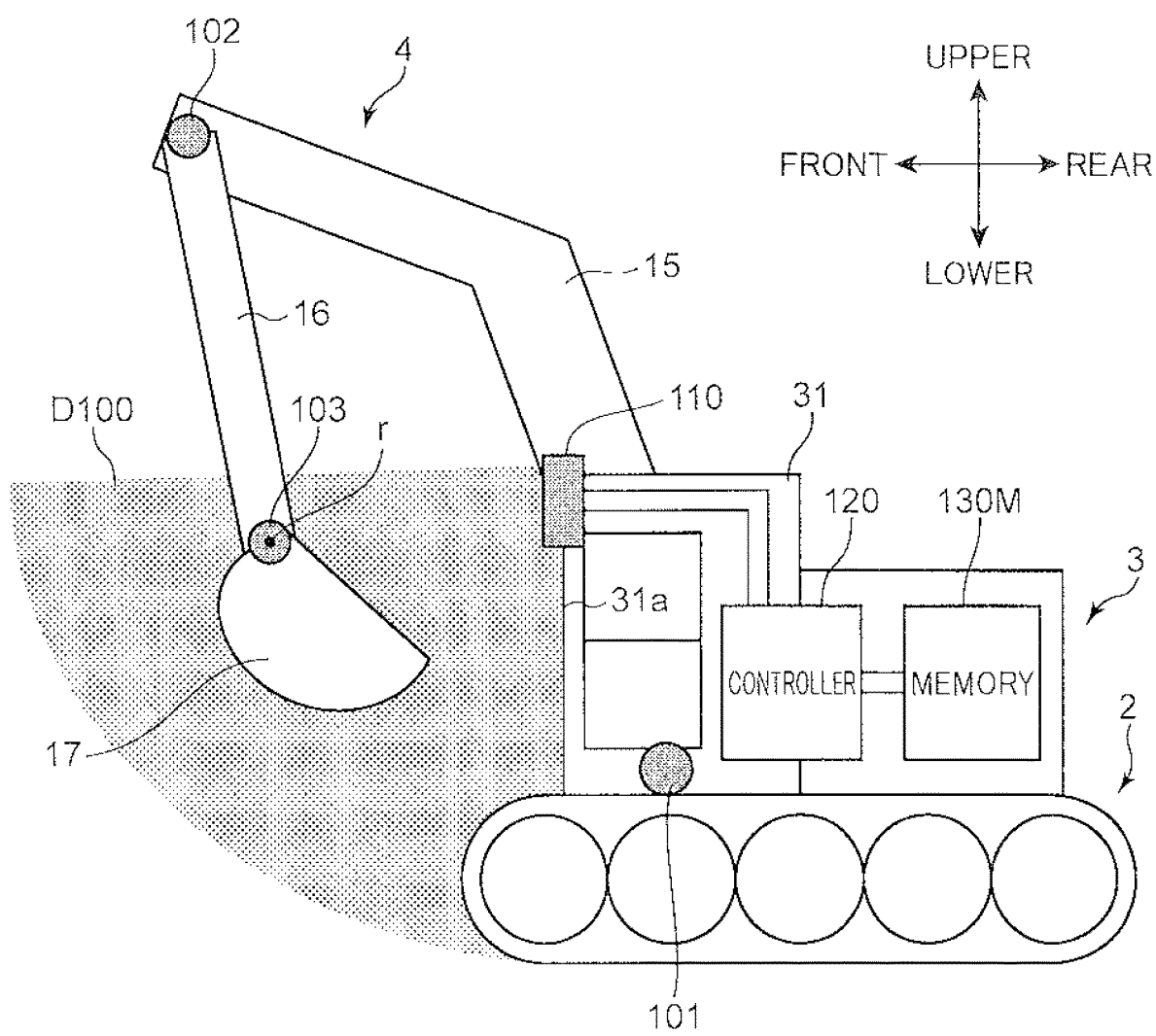
FIG. 1 is an external view of a construction machine to which an attachment recognition device according to embodiments of the present invention is applied.

FIG. 1 is an external view of a construction machine 1 to which an attachment recognition device according to embodiments of the present invention is applied. Here, a hybrid excavator is described as the construction machine 1 as an example, but the attachment recognition device may be applied to other construction machines such as a hydraulic excavator and a crane. Hereinafter, a front side direction of a cab 31 is described as a front direction, a rear side direction of the cab 31 is described as a rear direction, an upper side direction of the cab 31 is described as an upper direction, and a lower side direction of the cab 31 is described as a lower direction. The front and rear directions are collectively described as a front-rear direction, and the upper and lower directions are collectively described as an upper-lower direction. When looking forward from the cab 31, a left side direction is described as a left direction, and a right side direction is described as a right direction. The right and left directions are collectively described as a right-left direction.

The construction machine 1 includes a crawler type lower traveling body 2, an upper stewing body 3 (one example of a main body) provided on the lower traveling body 2 in a rotatable manner, and a posture-changeable work device 4 attached to the upper slewing body 3.

The work device 4 includes a boom 15 (one example of a movable part) attached to the upper slewing body 3, for example, adjacently to the right direction of the cab 31 such that the boom 15 can be raised and lowered, an arm 16 (one example of a movable part) pivotably attached to a tip portion of the boom 15, and an attachment 17 pivotably installed in an attachment installation unit r provided at a tip of the arm 16. The attachment 17 is installed in the attachment installation unit r in a replaceable manner. As the attachment 17, a bucket, a nibbler, a breaker, and the like can be employed.

The upper slewing body 3 is composed of a box body, and includes the cab 31 an operator boards. In the cab 31, a front side surface is described as a front surface 31a.

A distance sensor 110 is provided at a predetermined position (here, an upper end) of the front surface 31a. For the distance sensor 110, a measurement range D100 is set so as to cover at least an entire region of the front surface 31a. In an example of FIG. 1, an angle of view of the measurement range D100 is set at approximately 90 degrees, but this is one example.

This will prevent a dead angle of the distance sensor 110 from occurring on the front surface 31a. When an interference object, such as a tip of the attachment 17 and an obstacle grasped by the attachment 17, enters a predetermined distance range from the front surface 31a, this will allow the construction machine 1 to issue a warning to the operator or to perform interference prevention control to control the work device 4 so as to prevent interference of the interference object on the front surface 31a.

The construction machine 1 further includes angle sensors 101, 102, and 103. The angle sensor 101 is provided at a rotational fulcrum of the boom 15 and measures a rotation angle of the boom 15. The angle sensor 102 is provided at a rotational fulcrum of the arm 16 and measures a rotation angle of the arm 16. The angle sensor 103 is provided at a rotational fulcrum of the attachment 17 and measures a rotation angle of the attachment 17.

The upper slewing body 3 is provided with a controller 120 that is electrically connected to the distance sensor 110 and controls the entire construction machine 1. A memory 130M is electrically connected to the controller 120. The memory 130M is configured of a nonvolatile storage device, and stores a database 130 illustrated in FIG. 2.

Figure 2:
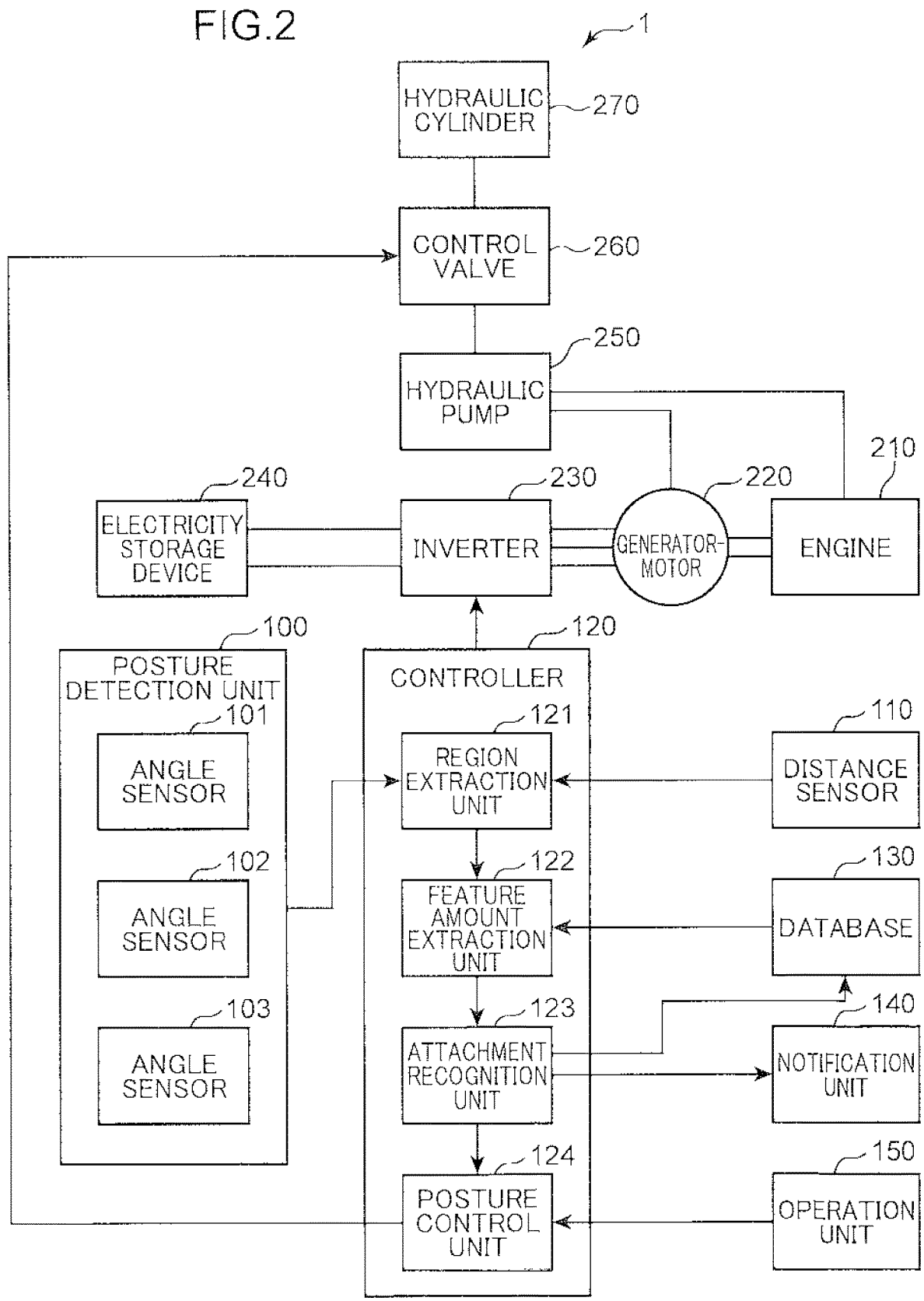
FIG. 2 is a block diagram illustrating one example of a system configuration of the construction machine illustrated in FIG. 1.

FIG. 2 is a block diagram illustrating one example of a system configuration of the construction machine 1 illustrated in FIG. 1. The construction machine 1 includes an engine 210, a hydraulic pump 250 and a generator-motor 220 coupled with an output shaft of the engine 210, a control valve 260 provided between the hydraulic pump 250 and a hydraulic cylinder 270, an electricity storage device 240 that can charge power generated by the generator-motor 220, and an inverter 230 that converts power of the electricity storage device 240 and the generator-motor 220.

The hydraulic pump 250 operates by motive power of the engine 210 and discharges an operating oil. The operating oil discharged from the hydraulic pump 250 is guided to the hydraulic cylinder 270 with a flow rate controlled by the control valve 260. Note that the operating oil discharged from the hydraulic cylinder 270 is returned to an unillustrated tank by the control valve 260.

Under the control of the controller 120, the control valve 260 sets a valve opening at an opening according to an operation amount of an operation unit 150.

The hydraulic cylinder 270 includes a boom cylinder that raises and lowers the boom 15 with respect to the upper slewing body 3 by expanding and contracting on receipt of supply of the operating oil, an arm cylinder that pivots the arm 16 with respect to the boom 15 by expanding and contracting on receipt of supply of the operating oil, and a bucket cylinder that pivots the attachment 17 with respect to the arm 16 by expanding and contracting on receipt of supply of the operating oil.

The generator-motor 220 has a function as a generator that converts motive power of the engine 210 into electric power, and a function as a motor that converts electric power stored in the electricity storage device 240 into motive power. In an example of FIG. 2, the generator-motor 220 is, for example, a three-phase motor, but this is one example, and may be a single-phase motor.

The electricity storage device 240 is configured of, for example, various secondary batteries such as a lithium ion battery, a nickel hydrogen battery, an electric double layer capacitor, and a lead battery.

Under the control of the controller 120, the inverter 230 controls switching between an operation as the generator of the generator-motor 220 and an operation as the motor of the generator-motor 220. Also, under the control of the controller 120, the inverter 230 controls a current for the generator-motor 220 and torque of the generator-motor 220. In the example of FIG. 2, the inverter 230 is, for example, a three-phase inverter, but this is one example and may be a single-phase inverter.

Furthermore, the construction machine 1 includes a posture detection unit 100, the distance sensor 110 and the controller 120 illustrated in FIG. 1, the database 130, a notification unit 140 that notifies an operator of various information items, and the operation unit 150 that receives an operator's operation.

The posture detection unit 100 includes the angle sensors 101, 102, and 103 described in FIG. 1, and detects the posture of the work device 4. Here, the posture of the work device 4 is identified by the rotation angle oldie boom 15, the rotation angle of the arm 16, and the rotation angle of the attachment 17.

The distance sensor 110 measures distance distribution of a surrounding object of the cab 31 including the attachment 17. Here, the distance sensor 110 is, for example, a depth sensor that emits an infrared ray at constant time intervals (for example, 30 fps) and measures time from emitting the infrared ray to receiving reflected light in pixel units. The distance sensor 110 acquires distance image data indicating the distance distribution of a surrounding environment of the cab 31.

The depth sensor that emits an infrared ray has been increasingly used in practical applications in recent years as a distance measuring unit. The depth sensor is used as an input interface for inputting gestures in games and the like. Furthermore, since the construction machine 1 is sometimes used at night, the depth sensor using an infrared ray is useful for the construction machine 1. Note that for the depth sensor that emits an infrared ray, a method for measuring time from emitting an infrared ray to receiving reflected light as described above is known as a time of flight (ToF) method. In addition, as the depth sensor, a pattern emission method for measuring a distance from a light-receiving pattern of reflected light when a specified pattern is emitted is known. This pattern emission depth sensor may be employed. Since the construction machine 1 often works outdoors, a laser scanning ToF depth sensor that is resistant to interference with sunlight may be employed.

Here, the depth sensor is used as the distance sensor 110, but the present invention is not limited to this example. The distance sensor 110 may be a stereo camera that is relatively less expensive than the depth sensor.

The controller 120 is configured of, for example, a processor such as a microcontroller and a storage device that stores a program and the like. In addition, the controller 120 includes a region extraction unit 121, a feature amount extraction unit 122, an attachment recognition unit 123, and a posture control unit 121. The region extraction unit 121, the feature amount extraction unit 122, the attachment recognition unit 123, and the posture control unit 124 may be configured of dedicated hardware circuits, or may be implemented by a CPU executing a program.

The region extraction unit 121 extracts a region indicating distance distribution of the attachment 17 from the distance image data by using the posture detected by the posture detection unit 100.

Figure 4:
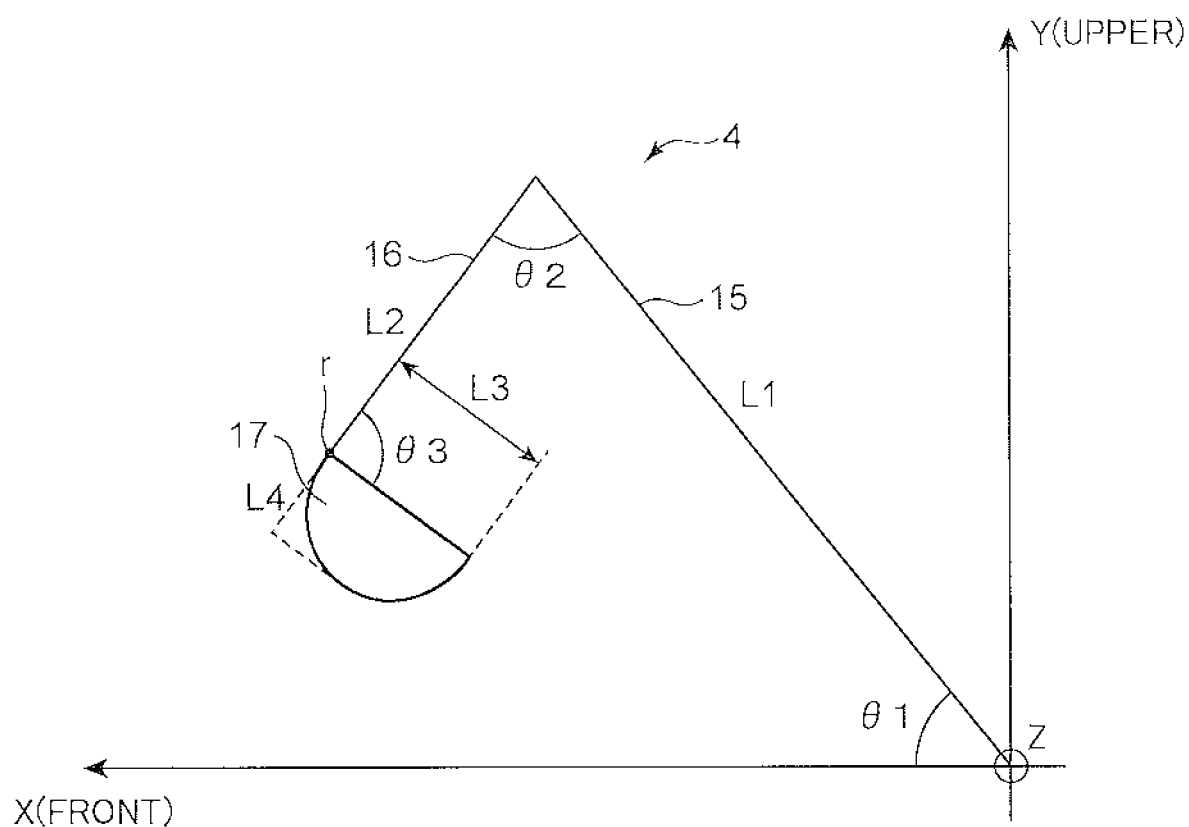
FIG. 4 is a diagram illustrating a work device in a simplified manner.

FIG. 4 is a diagram illustrating the work device 4 in a simplified manner. In FIG. 4, the boom 15 and the arm 16 are each illustrated with a straight line to simplify the description. As illustrated in FIG. 4, a position and posture of the work device 4 are represented by a three-dimensional coordinate system of the construction machine 1. In an example of FIG. 4, the three-dimensional coordinate system of the construction machine 1 is defined by a Y axis indicating the upper-lower direction, an X axis indicating the front-rear direction, and a Z axis indicating the right-left direction. The origin of the Y axis is set, for example, at a proximal end of the boom 15. The origin of the X axis is set, for example, on the front surface 31a. The origin of the Z axis is set, for example, at a center of the right-left direction of the front surface 31a.

A length L1 of the boom 15 and a length L2 of the arm 16 are known. Therefore, if a rotation angle θ1 of the boom 15 and a rotation angle θ2 of the arm 16 with respect to the boom 15 are known, an X coordinate value and a Y coordinate value of the attachment installation unit r provided at the tip of the arm 16 can be identified. Also, when the posture of the work device 4 changes on a plane parallel to the Y-X plane, a position of the proximal end of the boom 15 in the right-left direction is known, and accordingly, a Z coordinate value of the attachment installation unit r can also be identified.

Then, when the X, Y, Z coordinate values of the attachment installation unit r are known, it can be determined which coordinate in the distance image data measured by the distance sensor 110 corresponds to the attachment installation unit r, from the angle of view, an attaching position, and an angle of an optical axis of the distance sensor 110.

Meanwhile, in the distance image data, the attachment 17 is represented by a group of pixel data with depth continuously distributed. Therefore, if the coordinates of the attachment installation unit r in the distance image data are known, by extracting the group of pixel data with the coordinates as a base point, the region indicating the distance distribution indicating the attachment 17 can be extracted from the distance image data.

Therefore, the region extraction unit 121 obtains the position of the attachment installation unit r in the three-dimensional coordinate system of the construction machine 1 from the rotation angles θ1 and θ2. Through coordinate conversion of the obtained position into the three-dimensional coordinate system of the distance sensor 110, the region extraction unit 121 obtains the coordinates of the attachment installation unit r in the distance image data. Then, the region extraction unit 121 extracts the region of the attachment 17 by extracting the group of pixel data with depth continuously distributed with the attachment installation unit r as a base point.

The feature amount extraction unit 122 extracts the feature amount of the attachment 17 from the region indicating the distance distribution of the attachment 17 extracted by the region extraction unit 121.

Figure 5:
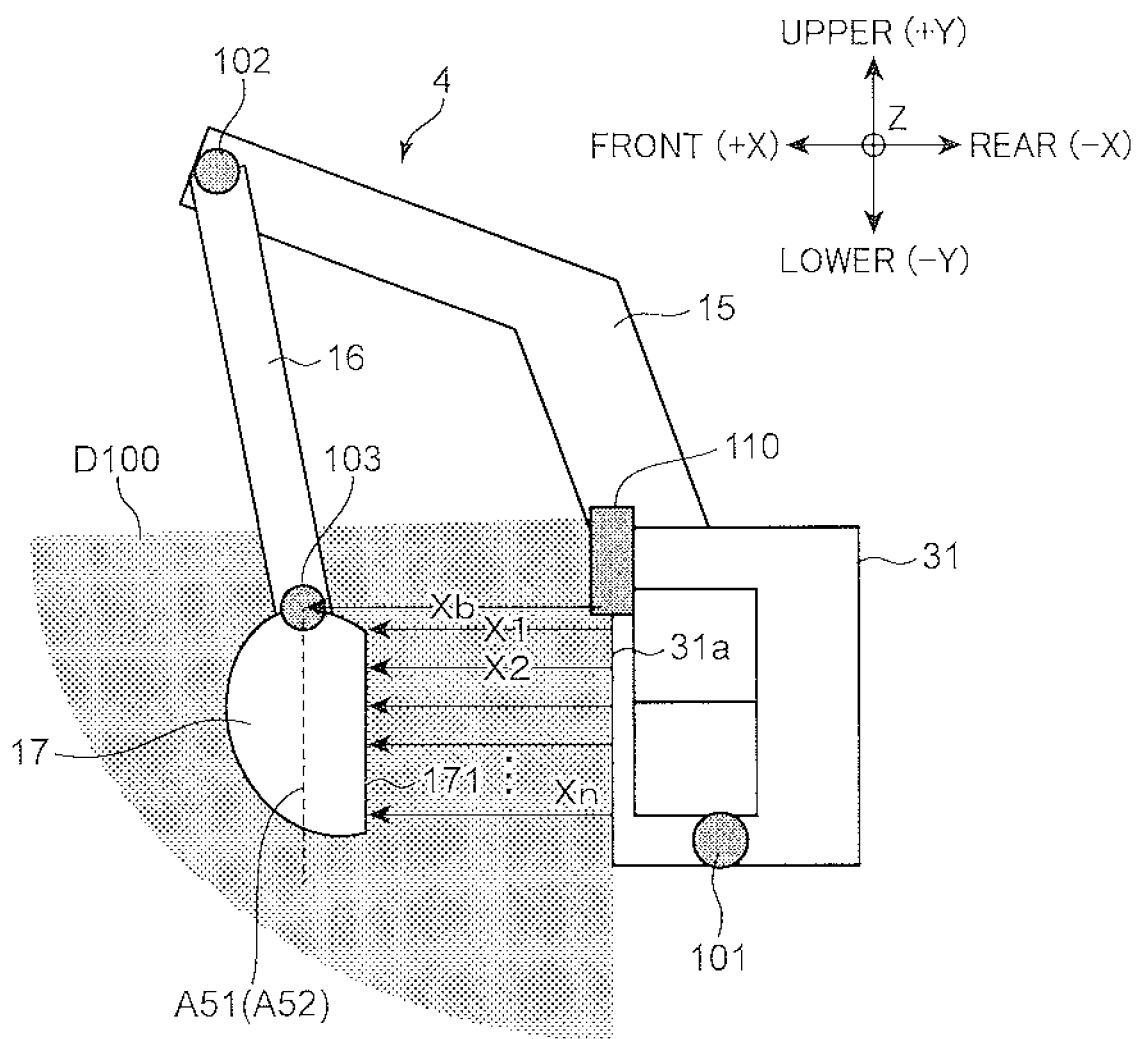
FIG. 5 is an explanatory diagram of a feature amount extraction process.
Figure 6:
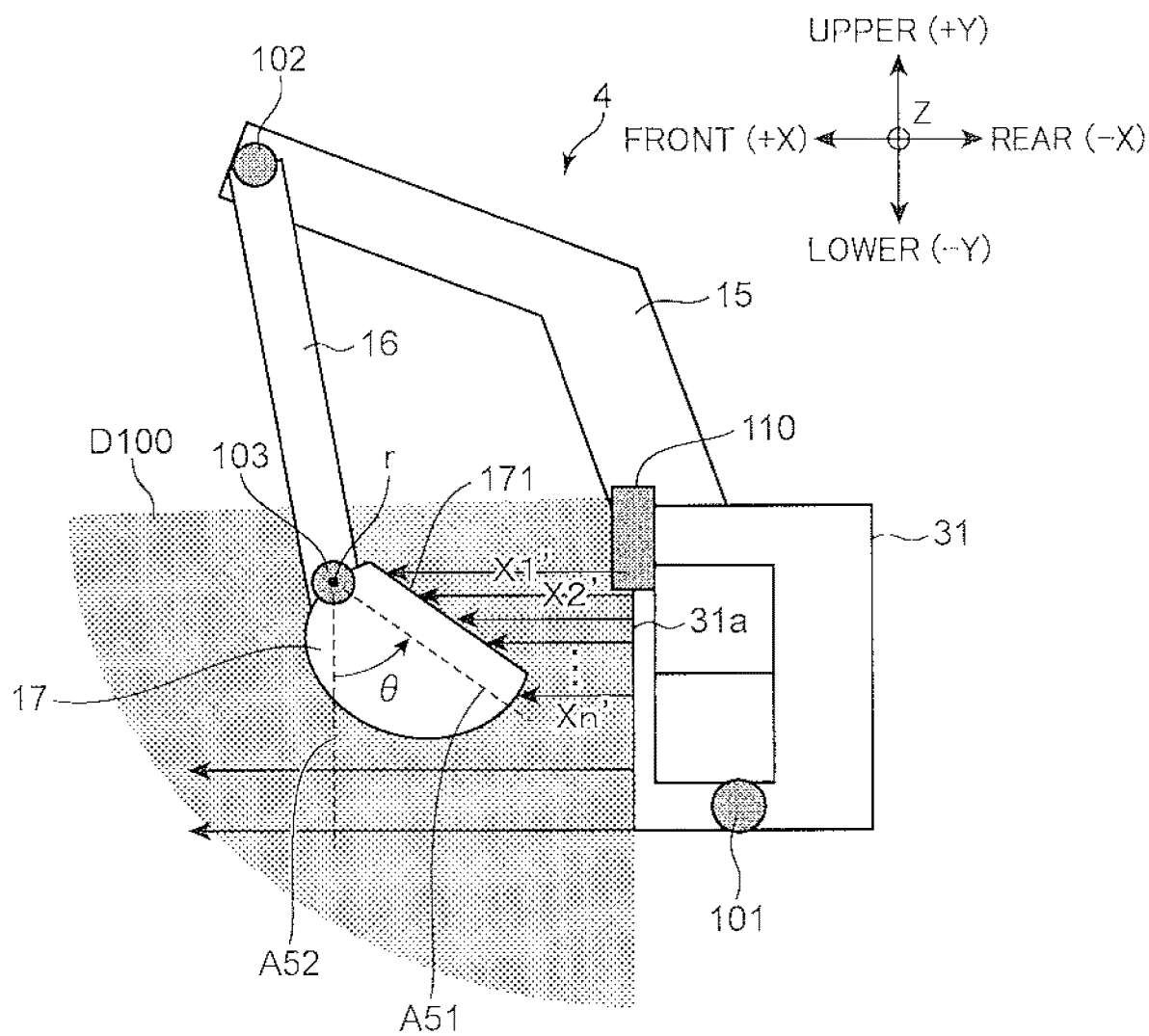
FIG. 6 is an explanatory diagram of the feature amount extraction process.

FIGS. 5 and 6 are explanatory diagrams of a feature amount extraction process. FIG. 5 shows a state in which a posture plane A51 defining the posture of the attachment 17 is positioned parallel to a vertical plane A52. FIG. 6 shows a state in which the posture plane A51 is positioned at an angle θ with respect to the vertical plane A52. In FIGS. 5 and 6, the upper-lower direction is described as the Y direction, the front-rear direction is described as the X direction, and the right-left direction is described as the Z direction.

The posture plane A51 is a plane passing in a longitudinal direction of the attachment 17 and is a plane orthogonal to an X-Y plane. Note that the angle θ of the posture plane A51 with respect to the vertical plane A52 illustrated in FIG. 6 can be calculated from the rotation angles θ1 to θ3. The vertical plane A52 is a plane that passes the attachment installation unit r and is orthogonal to the X direction. The attachment installation unit r has a depth of Xb and a Y-direction value (altitude) of Yb.

The feature amount of the attachment 17 is defined by a shape of a surface 171 on a cab 31 side of the attachment 17. The shape of the surface 171 is defined by a height of the surface 171 relative to the posture plane A51. In FIG. 5, one line of pixel data group parallel to the Y direction on the surface 171 has depths of (X1, X2, ..., Xn). In FIG. 5, since the posture plane A51 agrees with the vertical plane A52, the heights of this one line of pixel data group from the posture plane A51 are represented as (X1−Xb, X2−Xb, ..., Xn−Xb). Also, on the surface 171, the heights of the posture plane A51 of another line of pixel data group parallel to the Y direction are also represented as (X1−Xb, X2−Xb, ..., Xn−Xb).

Meanwhile, in FIG. 6, one line of pixel data group parallel to the Y direction on the surface 171 has depths of (X1', X2', . . . , Xn'). However, in FIG. 6, since the posture plane A51 is positioned at the angle θ counterclockwise with respect to the vertical plane A52, (X1'−Xb, X2'−Xb, . . . , Xn'−Xb) do not represent the heights from the posture plane A51.

In this case, the pixel data group having the depths of (X1', X2', . . . , Xn') is rotated clockwise by the angle θ around the attachment installation unit r to obtain (X1'θ, X2'_θ, . . . , Xn'_θ). Then, since the posture plane A51 agrees with the vertical plane A52, (X1'_θ−Xb, X2'_θ−Xb, . . . , Xn'_θ−Xb) represents the heights of the surface 171 relative to the posture plane A51.

Therefore, the feature amount extraction unit 122 first calculates the angle θ by using the rotation angles θ1 to θ3. Next, all lines of pixel data group parallel to the Y direction indicating the surface 171 of the attachment 17 extracted by the region extraction unit 121 are rotated by an angle (−θ) by rotation matrix calculation around the attachment installation unit r on the X-Y plane. Then, by performing calculation of (X1 θ−Xb, X2 θ−Xb, . . . , Xn_θ−Xb) on the pixel data group (X1 θ, X2_θ, . . . , Xn_θ) rotated by the angle (−θ), the feature amount extraction unit 122 calculates the feature amount of the attachment 17 (X1"(X1_θ−Xb), X2" (=X2 0−Xb), . . . , Xn"(Xn_θ−Xb)).

With this calculation, the feature amount (X1", X2", . . . , Xn") indicates the heights of the attachment 17 from the posture plane A51. The database 130 stores the heights of the surface 171 of the reference attachment with respect to the posture plane A51 as the feature amount of the reference attachment. Therefore, the feature amount of the attachment 17 (X1", X2", . . . , Xn") can be compared with the feature amount of the reference attachment stored in the database 130. Here, the feature amount extraction unit 122 rotates all lines of pixel data group parallel to the Y direction. However, if the feature amount of the reference attachment includes one line of data parallel to the Y direction, the feature amount extraction unit 122 may rotate only one line of pixel data group parallel to the Y direction.

Reference is returned to FIG. 2. The attachment recognition unit 123 compares the feature amount extracted by the feature amount extraction unit 122 with the feature amount of one or more reference attachments stored in the database 130 to recognize the attachment 17. Specifically, the attachment recognition unit 123 calculates similarity between the feature amount of the attachment 17 (X1", X2", . . . , Xn") and the feature amount of each reference attachment stored in the database 130. The attachment recognition unit 123 recognizes the reference attachment having similarity equal to or greater than reference similarity and having the maximum similarity, as an attachment of the same type as the attachment 17.

Here, the feature amount is represented as three-dimensional data indicating height distribution of the surface 171 relative to the posture plane A51. Therefore, the attachment recognition unit 123 may calculate the similarity by using the Jaccard coefficient or the Dice coefficient that allows calculation of similarity between three-dimensional point groups.

The posture control unit 124 controls the posture of the work device 4 so as to take a posture according to the operation amount output from the operation unit 150. Also, for example, the posture control unit 124 detects a distance from the cab 31 to the interference object by using the posture of the work device 4 detected by the posture detection unit 100 and the distance image data measured by the distance sensor 110. When the distance becomes equal to or less than a reference distance, the posture control unit 124 performs interference prevention control for controlling the work device 4 to prevent the interference object from interfering with the cab 31. Also, when the distance from the cab 31 to the interference object becomes equal to or less than the reference distance, the posture control unit 124 notifies the operator of danger of interference by using the notification unit 140.

Figure 3:
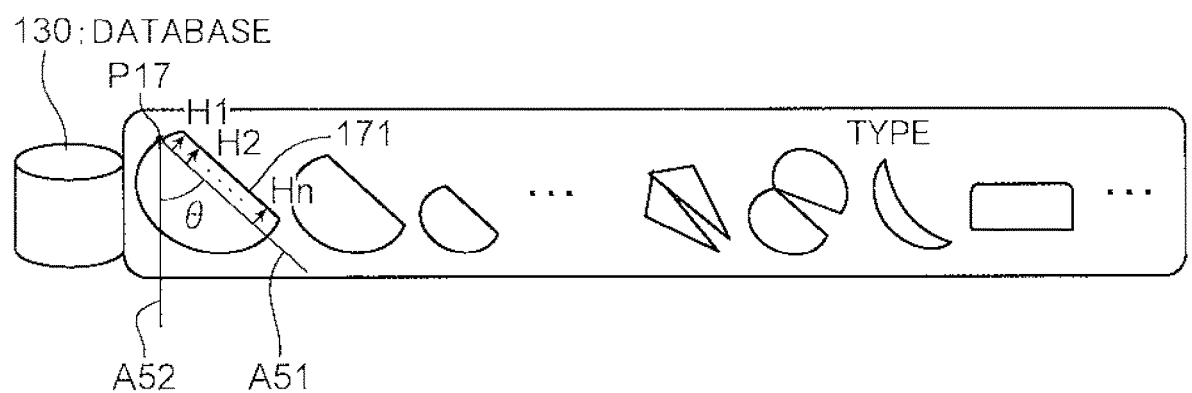
FIG. 3 is a diagram conceptually illustrating a feature amount of a reference attachment stored in a database.

The database 130 stores the feature amount of one or more reference attachments in advance. FIG. 3 is a diagram conceptually illustrating the feature amount of the reference attachment stored in the database 130. As illustrated in FIG. 3, the database 130 stores the feature amount of various attachments such as a bucket, a breaker, and a nibbler. Here, for example, heights of the surface 171 with respect to the posture plane A51 (H1, H2, . . . Hn) are employed as the feature amount of the reference attachment.

Note that in the example described above, the feature amount extraction unit 122 rotates the pixel data group (X1, X2, . . . , Xn) by the angle (−θ) to calculate the feature amount of the attachment 17, but the present invention is not limited to this example. For example, the feature amount extraction unit 122 may extract the pixel data group (X1−Xb, X2−Xb, . . . , Xn−Xb) as the feature amount of the attachment 17. In this case, the attachment recognition unit 123 may rotate the reference attachment by the angle θ, and compare the feature amount of the rotated reference attachment with the feature amount of the attachment 17.

Specifically, as illustrated in FIG. 3, the attachment recognition unit 123 rotates the reference attachment by the angle θ with respect to the vertical plane A52 about a base point P17 as a rotation center to make the posture of the reference attachment the same as the posture of the attachment 17. Then, the attachment recognition unit 123 may determine the height of each position of the rotated surface 171 from the vertical plane A52 and compare the height with the feature amount of the attachment 17. Note that the base point P17 indicates the installation position in the attachment installation unit r.

Reference is returned to FIG. 2. The notification unit 140 includes a buzzer, a display panel, and a warning lamp provided inside the cab 31. The notification unit 140 issues a warning to the operator under the control of the posture control unit 124.

The operation unit 150 includes an operation lever for receiving the operator's operation for changing the posture of the work device 4, and a mode setting button for receiving input of a mode setting command by the operator for setting an operation mode of the construction machine 1. Note that if the construction machine 1 includes a touch panel display, the mode setting button may be comprised of the touch panel display. The operation lever outputs a signal indicating the operation amount to the controller 120.

Figure 7:
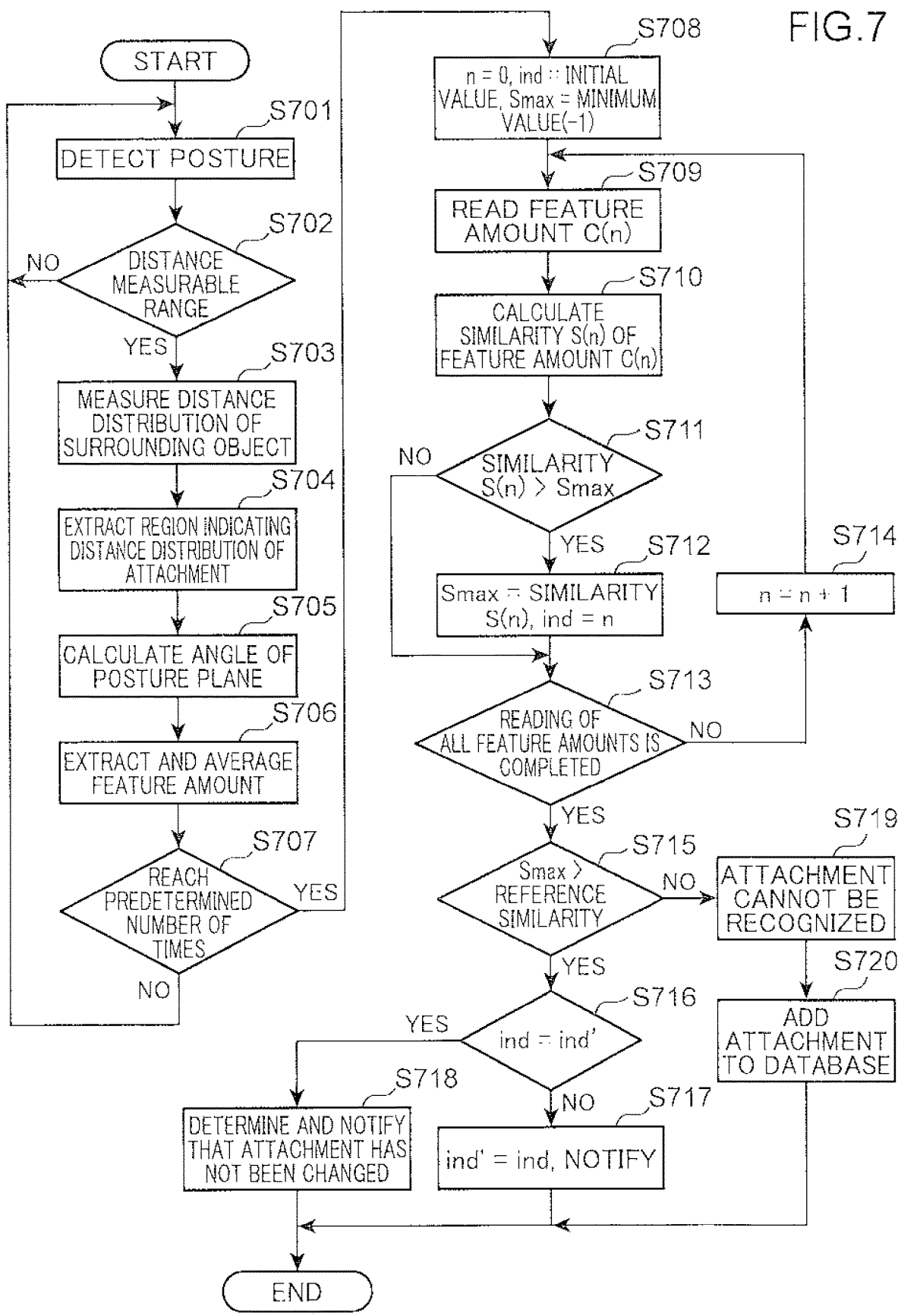
FIG. 7 is a flowchart illustrating a process of the attachment recognition device according to a first embodiment of the present invention.

FIG. 7 is a flowchart illustrating a process of the attachment recognition device according to the first embodiment of the present invention. This flowchart is executed, for example, when the engine 210 of the construction machine 1 starts. First, the posture detection unit 100 detects the posture of the work device 4. Next, the region extraction unit 121 determines from the detected posture whether the posture of the work device 4 is within a distance measurable range (S702). Here, when at least the entire attachment 17 has entered the measurement range D100, the region extraction unit 121 may determine that the posture of the work device 4 is within the distance measurable range. For example, the region extraction unit 121 may obtain the position of the attachment installation unit r of the arm 16 by using the method described in FIG. 4, set a circle having the assumed maximum radius of the attachment 17 around the attachment installation unit r, and determine that the posture of the work device 4 is within the distance measurable range if the set circle is within the measurement range D100. Thus, by monitoring the posture of the work device 4 until the posture of the work device 4 enters the distance measurable range, the region extraction unit 121 prevents measurement of distance image data that does not include the attachment 17.

If the posture of the work device 4 is within the distance measurable range (YES in S702), the distance sensor 110 acquires the distance image data indicating the distance distribution of a surrounding object of the cab 31 (S703). On the other hand, if the posture of the work device 4 is not within the distance measurable range (NO in S702), the process returns to S701.

In step S704, the region extraction unit 121 obtains the coordinates of the attachment installation unit r in the distance image data by using the posture detected in step S701 (rotation angles θ1 to θ3), and then extracts, from the coordinates, a group of pixel data with continuous depth as the region indicating the distance distribution of the attachment 17.

Next, the feature amount extraction unit 122 calculates the angle θ of the posture plane A51 by using the posture detected in S701 (rotation angles θ1 to θ3) (S705).

Next, the feature amount extraction unit 122 rotates the pixel data group constituting the region extracted in S704 by the angle (−θ) in X-Y plan view, and extracts the feature amount of the attachment 17 by calculation of (X1 θ−Xb, X2_θ−Xb, . . . , Xn θ−Xb) (S706). Also, in step S706, the feature amount extraction unit 122 averages the extracted feature amount. For example, in the loop from S701 to S707, the feature amount extraction unit 122 calculates the feature amount by adding the feature amount calculated in the current loop to an average value of the feature amount calculated in the loop up to the previous time for averaging. This will provide the feature amount in which on influence of noise and measurement variation is suppressed.

In step S707, if the number of extractions of the feature amount does not reach a predetermined number of times (NO in step S707), the process returns to step S701. On the other hand, if the number of extractions of the feature amount reaches the predetermined number of times (YES in S707), the process proceeds to S708.

Next, the attachment recognition unit 123 sets a variable n for identifying one reference attachment of interest at an initial value (for example, "0"), sets a variable ind for identifying the reference attachment having the maximum similarity at an initial value, and sets the maximum similarity Smax at the minimum value (for example, "−1") (S708).

Next, the attachment recognition unit 123 reads a feature amount C (n) of the reference attachment from the database 130 (S709).

Next, the attachment recognition unit 123 calculates similarity S (n) between the feature amount C (n) and the averaged feature amount calculated in S706, that is, the feature amount of the attachment 17 (S710).

Next, if the similarity S (n) is larger than the maximum similarity Smax (YES in S711), the attachment recognition unit 123 sets the maximum similarity Smax at the similarity S (n) and sets the variable ind at n (S712). On the other hand, if the similarity S (n) is not larger than the maximum similarity Smax (NO in S711), the process proceeds to S713. As a result, the similarity S (n) of the reference attachment most similar to the attachment 17 among the reference attachments read up to the present time is stored in the maximum similarity Smax. The variable n for identifying the reference attachment most similar to the attachment 17 among the reference attachments read up to the present time is stored in the variable ind.

Next, if the reading of the feature amount C (n) of all the reference attachments from the database 130 has not been completed (NO in S713), the attachment recognition unit 123 increments the variable n by 1 (S714), and the process returns to step S709. As a result, the feature amount C (n+1) of the next reference attachment is read from the database 130, and the similarity S (n+1) between the feature amount C (n+1) and the feature amount of the attachment 17 is calculated. On the other hand, if the reading of the feature amount C (n) of all the reference attachments from the database 130 has been completed (YES in S713), the process proceeds to S715. That is, through the repetition of the process of S709 to S713, the reference attachment which is a candidate for the attachment 17 is determined from among all the reference attachments.

In S715, the attachment recognition unit 123 determines whether the maximum similarity Smax is larger than the reference similarity. If the maximum similarity Smax is larger than the reference similarity (YES in S715), the attachment recognition unit 123 determines that the candidate reference attachment corresponds to the attachment 17, and determines whether the variable ind is equal to the variable ind' currently stored in the memory 130M (S716).

If the variable ind is equal to the variable ind' (YES in S716), the attachment recognition unit 123 determines that the attachment 17 has not been changed and causes the notification unit 140 to notify this determination (S718). In this case, the notification unit 140 may output a message using a voice or image such as "Attachment has not been changed.".

On the other hand, if the variable ind is not equal to the variable ind' (NO in S716), the attachment recognition unit 123 determines that the attachment 17 has been changed, updates the variable ind' with the variable ind, and causes the notification unit 140 to notify that the attachment 17 has been changed (S717). In this case, the notification unit 140 may output a message using a voice or image such as "Attachment has been changed.". After this, as the updated variable ind' indicates, the reference attachment is recognized as the attachment 17 attached to the work device 4, and interference prevention control and the like are performed.

In S715, if the maximum similarity Smax is not larger than the reference similarity (NO in S715), the attachment recognition unit 123 determines that the attachment 17 cannot be recognized (S719). This makes it possible to prevent determination that the attachment 17 corresponds to either reference attachment although the attachment of the same type as the attachment 17 has not been stored in the database 130.

Next, the attachment recognition unit 123 adds the feature amount of the attachment 17 to the database 130 (S720). This causes the new attachment to be registered in the database. This makes it possible to prevent a failure in recognition of the new attachment.

Thus, the attachment recognition device according to the first embodiment enables recognition of a variety of attachments other than a bucket (for example, a nibbler and a breaker) in a short time without manually inputting identification information about the attachment.

Second Embodiment

A second embodiment sets an operation mode of a construction machine 1 as a recognition mode for recognizing an attachment 17. Note that in the present embodiment, the same components as in the first embodiment are denoted with the same reference signs, and the description thereof will be omitted.

Figure 8:
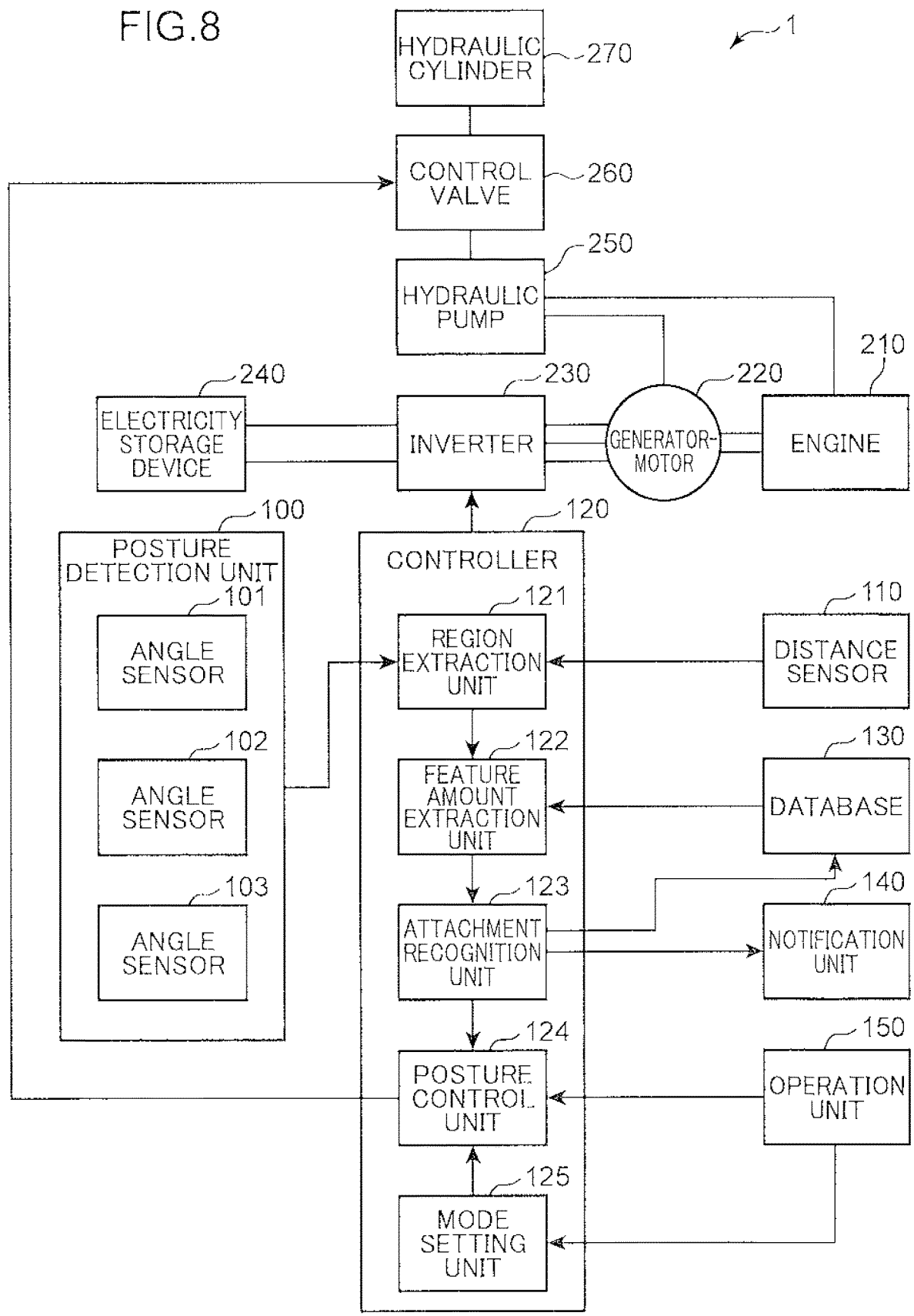
FIG. 8 is a block diagram illustrating a system configuration of an attachment recognition device according to a second embodiment of the present invention.

FIG. 8 is a block diagram illustrating a system configuration of an attachment recognition device according to the second embodiment of the present invention. FIG. 8 differs from FIG. 2 in that a mode setting unit 125 is added.

The mode setting unit 125 sets the operation mode of the construction machine 1 as the recognition mode for recognizing the attachment 17. Here, the mode setting unit 125 may set the operation mode of the construction machine 1 as the recognition mode when an operator presses a mode setting button included in an operation unit 150.

In the present embodiment, when the mode setting unit 125 sets the recognition mode, a posture control unit 124 controls a control valve 260 such that a posture of a work device 4 becomes a predetermined measurement posture (one example of a specified posture). Here, as the measurement posture, it is possible to employ a posture in which a posture plane A51 of the attachment 17 is parallel to a vertical plane A52. This is because a feature amount of a reference attachment is defined by a height of a surface 171 of the reference attachment relative to the posture plane A51 as illustrated in FIG. 3.

However, this is one example, and a posture in which the posture plane A51 has a certain angle θ with respect to the vertical plane A52 may be employed as the measurement posture. For example, it is assumed that a database 130 stores the height of the surface 171 of the reference attachment from the vertical plane A52 when the posture plane A51 is positioned at the angle θ with respect to the vertical plane A52, as the feature amount of the reference attachment. In this case, the measurement posture may be a posture in which the posture plane A51 is inclined by the angle θ with respect to the vertical plane A52.

Figure 9:
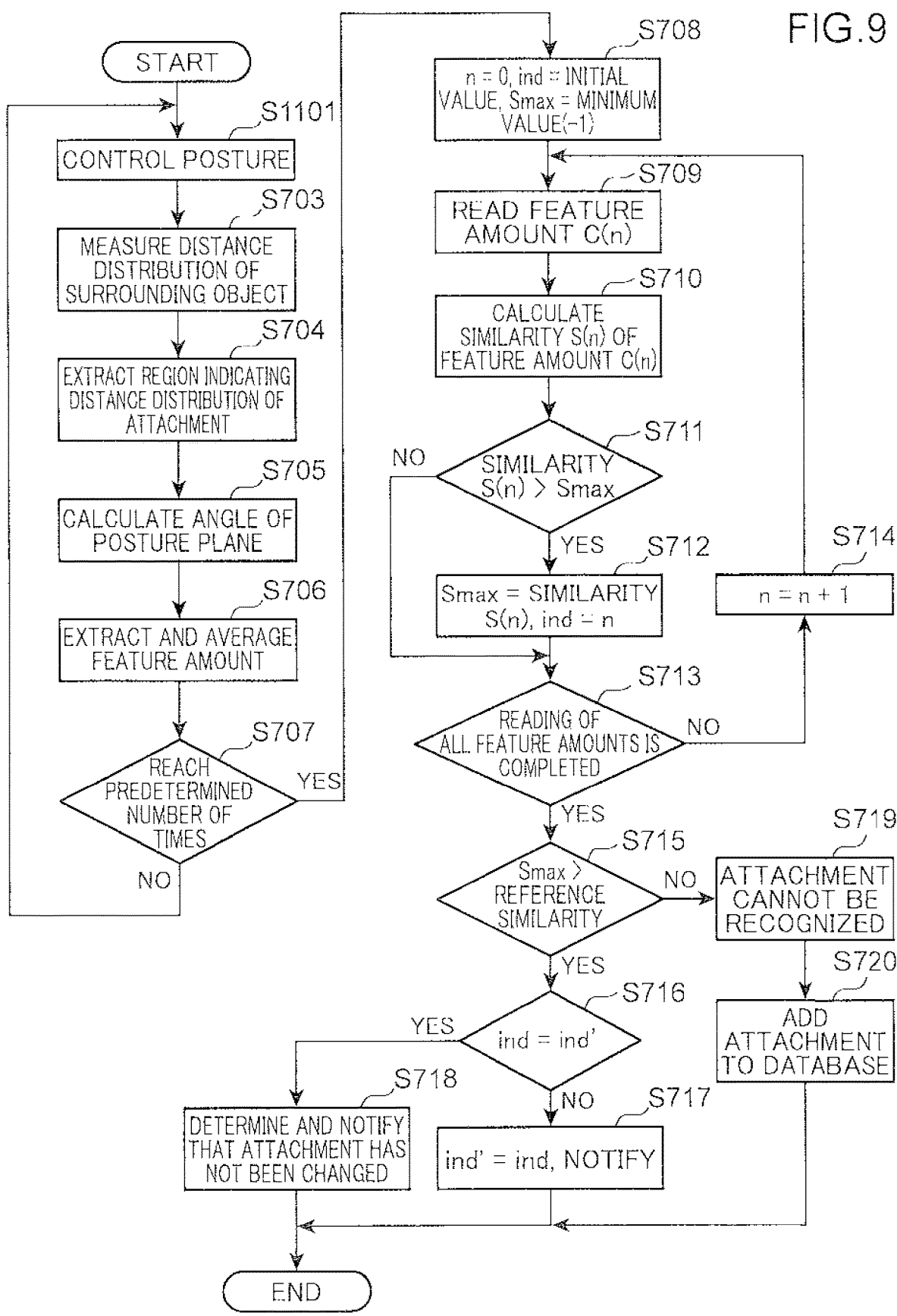
FIG. 9 is a flowchart illustrating a process of the attachment recognition device according to the second embodiment of the present invention.

FIG. 9 is a flowchart illustrating a process of the attachment recognition device according to the second embodiment of the present invention. Note that in FIG. 9, the same processes as in FIG. 7 are denoted with the same reference signs.

This flowchart starts when the operation mode is set as the recognition mode.

First, the posture control unit 124 controls the control valve 260 such that the posture of the work device 4 becomes the measurement posture (S1101). Here, the posture of the work device 4 is controlled at predetermined rotation angles θ1 to θ3 such that the posture plane A51 takes a posture that agrees with the vertical plane A52. With this control, the work device 4 is automatically controlled so as to take the measurement posture. In this automatic control, in view of safety, the posture control unit 124 may set, as the measurement posture, the posture of the work device 4 at a low speed such that there is no problem even when the work device 4 comes into contact with a human body or a surrounding object. Also, when the work device 4 comes into contact with a human body or a surrounding object, the posture control unit 124 may perform reaction force control to move the work device 4 in a direction away from the human body or the surrounding object.

In the above description, the automatic control is performed, but the posture control unit 124 may cause the operator to operate the operation unit 150 to set the posture of the work device 4 as the measurement posture. In this case, the posture control unit 124 may notify guidance for setting the posture of the work device 4 as the measurement posture by using a notification unit 140. When the posture of the work device 4 becomes the measurement posture, the posture control unit 124 may notify, by using the notification unit 140, that the posture of the work device 4 has become the measurement posture.

Then, when the posture of the work device 4 becomes the measurement posture, the process in and after S703 is executed, and the same process as in the first embodiment is executed.

For example, when a process for recognizing the attachment 17 is performed with a bucket containing earth and sand or a nibbler grasping an object, information about the attachment 17 changes. This may prevent accurate extraction of the feature amount of the attachment 17 and deteriorate recognition accuracy of the attachment 17.

According to the second embodiment, the posture of the work device 4 is set as the measurement posture and the process for recognizing the attachment 17 is executed. This makes it possible to extract the feature amount of the attachment 17 itself and to prevent deterioration in the recognition accuracy of the attachment 17.

Modification 1

In the above embodiment, the database 130 is provided in a memory 130M of the construction machine 1; however, the present invention is not limited to this, and the database 130 may be provided in a cloud server. In this case, the construction machine 1 may include a communication device for communicating with the cloud server. When the attachment 17 cannot be recognized by using the local database 130 provided in the construction machine 1, the database 130 in the cloud server may be used to recognize the attachment 17. Alternatively, the cloud server may be requested to perform a process for recognizing the attachment 17. In this case, an attachment recognition unit 123 and the database 130 may be provided in the cloud server. In this case, the construction machine 1 may perform the process until extracting the feature amount of the attachment 17, to transmit extraction results to the cloud server, and to request the cloud server to perform the recognition process of the attachment 17. With this process, more various attachments 17 can be recognized.

However, even if the number of types of reference attachments is increased in this way, for example, the attachment 17 modified by a user may be attached to the work device 4. In this case, since the database 130 cannot store the feature amount of such an attachment 17 in advance, the attachment 17 may not be recognized permanently.

In this case, interference prevention control and operation control suitable for the attachment 17 are no longer performed. Therefore, in the present embodiment, the process of S720 illustrated in FIGS. 7 and 9 is provided, and the feature amount of the attachment 17 that cannot be recognized is added to the database 130.

Modification 2

According to the above description, in S720, the feature amount of the attachment 17 is added to the database 130. In this case, the attachment recognition unit 123 may calculate a size and weight of the attachment from the feature amount of the attachment 17, and store the obtained size and weight together with the feature amount in the database 130.

A length, width, and depth of a rectangular parallelepiped when a rectangular parallelepiped circumscribed on the attachment 17 is applied can be employed as the size. With reference to FIG. 4, for example, L3 is the length and L4 is the depth. The width is the length in a right-left direction (Z direction) of the attachment 17. The weight, which is assumed to be the volume of the attachment 17, can be calculated by multiplying density of the attachment 17. This makes it possible to perform interference prevention control and motion control suitable for the attachment 17.

Modification 3

In the above description, the database 130 stores only the feature amount of the reference attachment; however, the present invention is not limited to this, and the size and weight of the reference attachment may be stored together with the feature amount. In this case, the attachment recognition device can obtain the size and weight of the attachment 17 from the database 130, without calculating the size and weight of the attachment 17 from the feature amount of the attachment 17. This makes it possible to perform suitable interference prevention control and motion control according to the size and weight of the attachment 17.

The attachment recognition unit 123 may obtain the size and weight of the attachment 17 from the feature amount of the attachment 17, and calculate similarity with the reference attachment by including the obtained size and weight in the feature amount. With this calculation, the attachment 17 can be recognized more accurately.

The features of the embodiments described above are summarized as follows.

An attachment recognition device according to one aspect of the present invention is an attachment recognition device for recognizing an attachment installed in an attachment installation unit in a construction machine including a work device including the attachment installation unit in which a plurality of types of attachment is installed in a replaceable manner. The attachment recognition device includes: a posture detection unit configured to detect a posture of the work device; a distance sensor configured to measure distance distribution of a surrounding object including the installed attachment; a region extraction unit configured to extract a region indicating distance distribution of the installed attachment from the distance distribution measured by the distance sensor by using the posture detected by the posture detection unit; a feature amount extraction unit configured to extract a feature amount of the installed attachment from the region extracted by the region extraction unit; a database configured to store a feature amount of one or more types of reference attachment in advance; and an attachment recognition unit configured to make comparison of the feature amount extracted by the feature amount extraction unit and the feature amount of the reference attachment to recognize the installed attachment.

According to this aspect, the region indicating the distance distribution of the attachment is extracted from the distance distribution of the surrounding object including the attachment measured by the distance sensor, by using the posture of the attachment. Then, the feature amount of the attachment is extracted from the extracted region, the extracted feature amount of the attachment is compared with the feature amount of the reference attachment stored in advance in the database, and the installed attachment is recognized.

Therefore, this aspect allows recognition of the attachment even if identification information about the attachment is not manually input. Also, since the attachment can be recognized without measuring the attachment before replacement, measurement work can be finished in a short time. Measurement work can also be performed at an arbitrary timing after replacement. By storing the feature amount of various reference attachments in the database, various attachments can be recognized.

In the above aspect, the attachment recognition device may further include: a mode setting unit configured to set an operation mode of the construction machine as a recognition mode for recognizing the installed attachment based on input of a mode setting command; and a posture control unit configured to cause the installed attachment to take a predetermined specified posture when the mode setting unit sets the recognition mode. The distance sensor may measure the distance distribution when the posture control unit causes the installed attachment to take the specified posture.

According to this aspect, the distance distribution when the posture control unit causes the attachment to take the specified posture is measured, and the attachment is recognized based on the measured distance distribution. Therefore, recognition errors of the attachment due to information change of the attachment occurring during the operation of the construction machine (for example, a bucket contains earth and sand, a nibbler grasps an object) can be prevented.

In the above aspect, the database may store, as the feature amount, the distance distribution of the reference attachment when the posture of the reference attachment is set as the specified posture.

According to this aspect, since the distance distribution of the reference attachment when the specified posture is taken is stored in advance in the database as the feature amount of the reference attachment, the feature amount of the attachment to be recognized can be used as it is for comparison with the feature amount of the reference attachment stored in the database.

In the above aspect, the construction machine may include a main body, the work device may include a movable unit that is pivotably connected to the main body and is provided with the attachment installation unit at a tip, the attachment may be pivotably connected to the attachment installation unit, the feature amount of the reference attachment may be defined by a height of a surface of the reference attachment with respect to a posture plane defining the posture of the reference attachment, and the feature amount extraction unit may rotate the distance distribution extracted by the region extraction unit around the attachment installation unit such that the posture plane defining the posture of the attachment is in a vertical direction, and the feature amount extraction unit may calculate a difference between the rotated distance distribution and a distance of the attachment installation unit as the feature amount.

In this aspect, the feature amount of the reference attachment is defined by the height of the surface of the reference attachment with respect to the posture plane defining the posture of the reference attachment. Therefore, it is necessary to employ the height of the surface of the attachment with respect to the posture plane as the feature amount of the attachment.

According to this aspect, since the distance distribution of the attachment is rotated around the attachment installation unit such that the posture plane of the attachment is in the vertical direction, the difference between the rotated distance distribution of the attachment and the distance of the attachment installation unit represents the height of the surface of the attachment with respect to the posture plane. Therefore, in this aspect, the feature amount of the attachment suitable for comparison with the feature amount of the reference attachment can be calculated by a simple process.

In the above aspect, when having failed to recognize of the installed attachment even with the comparison, the attachment recognition unit may add the feature amount of the attachment that is not recognized to the database.

According to this aspect, if the feature amount of the attachment to be recognized has not been stored in the database, the feature amount of the attachment is added to the database, which allows prevention of the attachment from remaining unrecognized. Even when an unexpected attachment is installed by a user, the database can be constructed such that the attachment is recognized.

In the above aspect, the attachment recognition device may further include a notification unit configured to notify a recognition result of the installed attachment by the attachment recognition unit.

According to this aspect, since the recognition result of the attachment is notified, it is possible to cause the operator to recognize that the attachment has been replaced.

The invention claimed is:

1. An attachment recognition device for recognizing an attachment installed in an attachment installation unit in a construction machine including a work device including the attachment installation unit in which a plurality of types of attachment is installed in a replaceable manner, the attachment installation unit being provided at a tip of the work device and the attachment being pivotably installed in the attachment installation unit, the attachment recognition device comprising:
   a posture detection sensor configured to detect a posture of the work device;
   a distance sensor configured to measure distance distribution of a surrounding object including the installed attachment;
   a database configured to store a feature amount of one or more types of reference attachment advance; and
   a controller including:
      a region extraction unit configured to extract a region indicating distance distribution of the installed attachment from the distance distribution measured by the distance sensor by using the posture detected by the posture detection sensor;
      a feature amount extraction unit configured to extract a feature amount of the installed attachment from the region extracted by the region extraction unit; and
      an attachment recognition unit configured to make comparison of the feature amount extracted by the feature amount extraction unit and the feature amount of the reference attachment to recognize the installed attachment.

2. The attachment recognition device according to claim 1, wherein the controller further includes:
   a mode setting unit configured to set an operation mode of the construction machine as a recognition mode for recognizing the installed attachment based on input of a mode setting command; and
   a posture control unit configured to cause the installed attachment to take a predetermined specified posture when the mode setting unit sets the recognition mode, wherein
   the distance sensor measures the distance distribution when the posture control unit causes the installed attachment to take the specified posture.

3. The attachment recognition device according to claim 2, wherein the database stores, as the feature amount, the distance distribution of the reference attachment when the posture of the reference attachment is set as the specified posture.

4. The attachment recognition device according to claim 1, wherein
   the construction machine includes a main body,
   the work device includes a movable unit that is pivotably connected to the main body and is provided with the attachment installation unit at a tip,
   the movable unit includes a boom and an arm pivotably attached to a tip of the boom, the arm being provided with the attachment installation unit at a tip thereof,
   the attachment is pivotably connected to the attachment installation unit,
   the feature amount of the reference attachment is defined by a height of a surface of the reference attachment with respect to a posture plane defining the posture of the reference attachment, and
   the feature amount extraction unit rotates the distance distribution extracted by the region extraction unit around the attachment installation unit such that the posture plane defining the posture of the installed attachment is in a vertical direction, and the feature amount extraction unit calculates a difference between the rotated distance distribution and a distance of the attachment installation unit as the feature amount.

5. The attachment recognition device according to claim 1, wherein when having failed to recognize the installed attachment even with the comparison, the attachment recognition unit adds the feature amount of the installed attachment to the database.

6. The attachment recognition device according to claim 1, further comprising a notification unit configured to notify a recognition result of the installed attachment by the attachment recognition unit, the notification unit being composed of at least one of a buzzer, a display panel, and a warning lamp.

* * * * *